US008914668B2

(12) United States Patent
Cudak et al.

(10) Patent No.: US 8,914,668 B2
(45) Date of Patent: Dec. 16, 2014

(54) ASYNCHRONOUS RAID STRIPE WRITES TO ENABLE RESPONSE TO MEDIA ERRORS

(75) Inventors: Gary D. Cudak, Creedmoor, NC (US); Christopher J. Hardee, Raleigh, NC (US); Randall C. Humes, Raleigh, NC (US); Adam Roberts, Moncure, NC (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 13/605,350

(22) Filed: Sep. 6, 2012

(65) Prior Publication Data

US 2014/0068324 A1    Mar. 6, 2014

(51) Int. Cl.
*G06F 11/00*    (2006.01)

(52) U.S. Cl.
USPC ............................................... 714/6.23

(58) Field of Classification Search
CPC ............ G06F 11/1402; G06F 11/1412; G06F 11/1448; G06F 11/2056; G06F 11/2084
USPC ......................................... 714/6.23; 711/162
See application file for complete search history.

(56) References Cited

U.S. PATENT DOCUMENTS

| 5,732,265 | A | 3/1998 | Dewitt et al. |
| 6,513,051 | B1 * | 1/2003 | Bolosky et al. ........................ 1/1 |
| 6,546,499 | B1 * | 4/2003 | Challener et al. ............. 714/6.12 |
| 7,190,537 | B2 * | 3/2007 | Jun .................................. 360/15 |
| 7,603,530 | B1 * | 10/2009 | Liikanen et al. ............... 711/162 |
| 8,539,148 | B1 * | 9/2013 | Chen et al. ..................... 711/112 |
| 2002/0032881 | A1 * | 3/2002 | Ng et al. ............................. 714/5 |
| 2002/0188800 | A1 * | 12/2002 | Tomaszewski et al. ........ 711/112 |
| 2003/0051110 | A1 * | 3/2003 | Gaspard et al. ................ 711/162 |
| 2004/0179386 | A1 * | 9/2004 | Jun ................................ 365/145 |
| 2005/0216657 | A1 * | 9/2005 | Forrer et al. ................... 711/112 |
| 2006/0106981 | A1 * | 5/2006 | Khurshudov et al. ......... 711/114 |
| 2007/0050423 | A1 | 3/2007 | Whalen et al. |
| 2007/0294598 | A1 * | 12/2007 | Anderson et al. ............... 714/54 |
| 2008/0155192 | A1 | 6/2008 | Iitsuka |

(Continued)

FOREIGN PATENT DOCUMENTS

| WO | WO2008019133 A2 | 2/2008 |
| WO | WO2010065821 A1 | 6/2010 |

OTHER PUBLICATIONS

Forman et al., "Finding Similar Files in Large Document Repositories", Chicago, Illinois, USA, KDD'05—Aug. 21-24, 2005, pp. 394-400.

*Primary Examiner* — Marc Duncan
(74) *Attorney, Agent, or Firm* — Katherine S. Brown; Jeffrey L. Streets

(57) ABSTRACT

A method includes detecting that a first file and a second file are duplicates, and storing the first file and the second file to a target storage device. Metadata is written to the target storage device in association with the first file, wherein the metadata identifies the location of the second file that is a duplicate of the first file. Later, an application program requests a first read operation to read the first file. In response to a media error that results from the first read operation, the target storage device reads the metadata associated with the first file to identify the location of the second file, performs a second read operation to read the second file instead of the first file, and provides the second file to the application program in satisfaction of the requested first read operation.

16 Claims, 3 Drawing Sheets

(56) References Cited

U.S. PATENT DOCUMENTS

| | | | |
|---|---|---|---|
| 2009/0164742 A1* | 6/2009 | Wach et al. | 711/162 |
| 2010/0070764 A1* | 3/2010 | Ishii et al. | 713/168 |
| 2010/0205508 A1* | 8/2010 | Mesonzhnik et al. | 714/763 |
| 2011/0145207 A1 | 6/2011 | Agrawal et al. | |
| 2013/0080403 A1* | 3/2013 | Yamakawa | 707/690 |
| 2013/0185589 A1* | 7/2013 | Kataria et al. | 714/6.11 |
| 2014/0068323 A1* | 3/2014 | Cudak et al. | 714/6.22 |

\* cited by examiner

ASYNCHRONOUS RAID STRIPE WRITES TO ENABLE RESPONSE TO MEDIA ERRORS

BACKGROUND OF THE INVENTION

1. Field of the Invention

The present invention relates to the storage and retrieval of digital data, and more particularly relates to methods for handling media errors.

2. Background of the Related Art

A media error occurs when a storage device has problems reading a file that is stored on that device. Typically, the storage device will make several attempts to read the data before concluding that the storage device has a damaged sector containing the file or that the storage device should be marked as being defunct. While the storage device attempts to reread the data, the read operation cannot be satisfied.

Furthermore, the storage device may attempt one or more error correction procedures on the file or the storage device before determining that the file cannot be accessed. Such error corrections may or may not result in successful reading of the file, and certainly cause a delay in reading the file. Furthermore, the error correction adds to the workload of the storage device and may delay other read operations and write operations involving the storage device.

BRIEF SUMMARY OF THE INVENTION

One embodiment of the present invention provides a method comprising detecting that a first file and a second file are duplicates, storing the first file and the second file to a target storage device, and writing metadata to the target storage device in association with the first file, wherein the metadata associated with the first file identifies the location of the second file. The method further comprises the target storage device, in response to a media error that results from a first read operation to read the first file, reading the metadata associated with the first file to identify the location of the second file, performing a second read operation to read the second file instead of the first file, and providing the second file in satisfaction of the first read operation.

Another embodiment of the invention provides a computer program product including computer usable program code embodied on a computer usable medium for a storage device handling media errors. The computer program product comprises: computer usable program code for, in response to a media error that results from a first read operation to read a first file, reading metadata associated with the first file to identify the location of a second file that is a duplicate of the first file, wherein the first file and the second file are stored on the storage device; computer usable program code for performing a second read operation to read the second file instead of the first file; and computer usable program code for providing the second file in satisfaction of the first read operation.

A further embodiment of the invention provides a computer program product including computer usable program code embodied on a computer usable medium for handling media errors. The computer program product comprises: computer usable program code for detecting that a first file and a second file are duplicates, computer usable program code for storing the first file and the second file to a target storage device, and computer usable program code for writing metadata to the target storage device in association with the first file, wherein the metadata associated with the first file identifies the location of the second file. The computer program product further comprises computer usable program code for responding to a media error that results from a first read operation to read the first file including reading the metadata associated with the first file to identify the location of the second file, performing a second read operation to read the second file instead of the first file, and providing the second file in satisfaction of the requested first read operation.

DETAILED DESCRIPTION OF THE INVENTION

Figure 1:
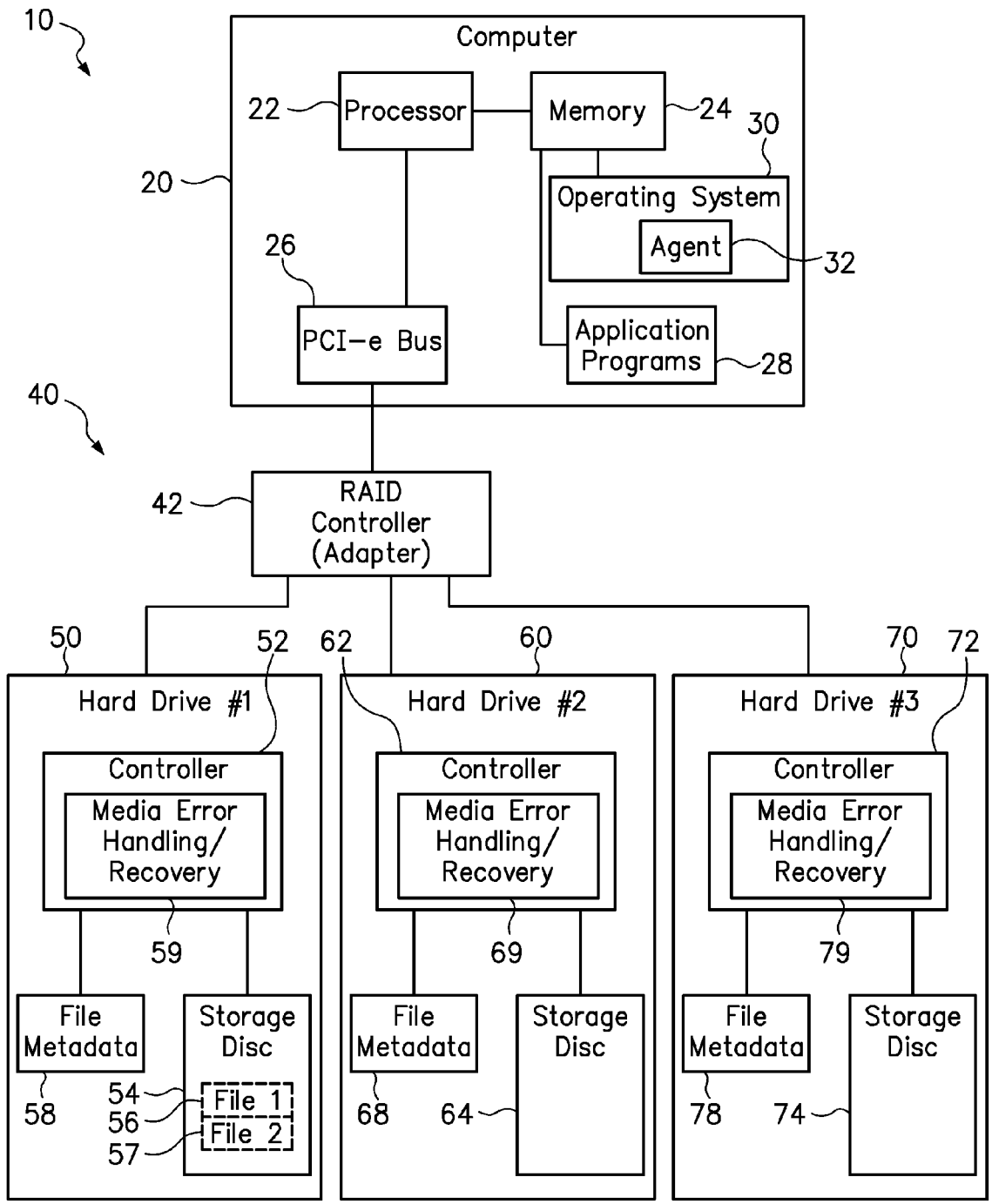
FIG. 1 is a diagram of a computer system and storage device in accordance with one embodiment of the invention.

One embodiment of the present invention provides a method comprising detecting that a first file and a second file are duplicates, storing the first file and the second file to a target storage device, and writing metadata to the target storage device in association with the first file, wherein the metadata associated with the first file identifies the location of the second file. The method further comprises the target storage device, in response to a media error that results from a first read operation to read the first file, reading the metadata associated with the first file to identify the location of the second file, performing a second read operation to read the second file instead of the first file, and providing the second file in satisfaction of the first read operation.

Detecting that the first file and the second file are duplicates is preferably performed by an agent running in an operating system. For example, in response to an application program requesting that the second file be written to a storage device, the agent may compare the second file to files previously stored on the storage devices that are attached to a given controller, such as a RAID controller. Optionally, the second file may be compared to the files previously stored by comparing a digest of the second file to digests of the files previously stored. Digests of the files previously stored may be generated in real time or the digests may be maintained in a list to facilitate the comparison.

In another embodiment, storing the first file to the target storage device may include copying a first previously stored segment of the first file from a second storage device to the target storage device so that all of the first file is stored on the target storage device. This may be the situation, for example, where the target storage device and the second storage device are in a RAID array. In many RAID arrays, files are typically stored in major stripes that extend across a plurality of storage devices such that segments of the file are stored on separate storage devices. In accordance with the present invention, those file segments that make up the first file should be collected and stored on a single storage device ("an asynchronous RAID stripe write"), which single storage device is referred to herein as the target storage device. In an optional aspect of the invention, the target storage device may be selected as the storage device in the RAID array that stores a segment that is larger than the segments stored on other storage devices in the RAID array.

As stated above, embodiments of the invention include writing metadata to the target storage device in association with the first file, wherein the metadata associated with the first file identifies the location of the second file. In the event that a media error occurs during a read operation of the first file, the metadata identifies where to find the second file that is a duplicate of the first file. However, another embodiment further includes writing metadata to the target storage device in association with the second file, wherein the metadata associated with the second file identifies the location of the first file. Therefore, in the event that a media error occurs during a read operation of the second file, the metadata identifies where to find the first file that is a duplicate of the second file.

In a first optional feature of the invention, the disk drive may perform and complete media error correction on the first file after the second file has been retrieved from the storage device and delivered to a requesting application program. In a second optional feature of the invention, attempts at error correction may be scheduled for a later time, for example when the disk drive is running at some predetermined high level of workload. In other words, the disk drive may be busy satisfying other read or write requests and delay error correction to a later point in time when demands on the disk driver are lower since the data that is the subject of the media error has been provided from an alternate source. The error correction process may result in the repair of the original file or a determination that the sector containing the file is bad.

Another embodiment of the invention provides a computer program product including computer usable program code embodied on a computer usable medium for a storage device handling media errors. The computer program product comprises: computer usable program code for, in response to a media error that results from a first read operation to read a first file, reading metadata associated with the first file to identify the location of a second file that is a duplicate of the first file, wherein the first file and the second file are stored on the storage device; computer usable program code for performing a second read operation to read the second file instead of the first file; and computer usable program code for providing the second file in satisfaction of the first read operation. This computer program product may reside entirely on a controller for the storage device and may respond to media errors by reading the duplicate file identified in the metadata, as described herein. This embodiment may be implemented without regard to how the metadata came to associate or cross-reference duplicate files.

A further embodiment of the invention provides a computer program product including computer usable program code embodied on a computer usable medium for handling media errors. The computer program product comprises: computer usable program code for detecting that a first file and a second file are duplicates, computer usable program code for storing the first file and the second file to a target storage device, and computer usable program code for writing metadata to the target storage device in association with the first file, wherein the metadata associated with the first file identifies the location of the second file. The computer program product further comprises computer usable program code for responding to a media error that results from a first read operation to read the first file including reading the metadata associated with the first file to identify the location of the second file, performing a second read operation to read the second file instead of the first file, and providing the second file in satisfaction of the requested first read operation. This computer program product may further include computer usable program code to implement any one or more additional aspects of the methods described herein.

Embodiments of the invention use intelligent tracking of duplicate files at the operating system (OS) level. The OS includes an agent that detects duplicate files and operates in a manner that is transparent to the user. For example, when an application program writes a file to a disk drive, the application program uses modules or drivers that are associated with the operating system. This presents an opportunity for the agent to compare files and detect duplicates. In an alternate embodiment, the agent may be implemented as firmware in a controller, such as a RAID controller.

When the agent detects that a duplicate file exists or is being written, the agent instructs the disk drive to modify the metadata associated with one or both of the duplicate files in order to cross-reference the location of the other one of the duplicate files. For example, metadata associated with a first file will be supplemented to include the location of a second file that is a duplicate of the first file. Preferably, metadata associated the second file will also be supplemented to include the location of the first file. Accordingly, the duplicate files may be said to be "mapped" to each other.

Later, when an application program needs to retrieve the file, a read request is sent to the disk drive. In response to the disk drive experiencing a media error, the read operation can be fulfilled with data from an alternate location that is identified in the metadata associated with the file. For example, in response to a media error during a read operation, the OS may read the metadata associated with the file, identify the location of a duplicate file, and issue a read request to retrieve the file from an alternate location. This alternate location may be either on the same drive or another drive in the array. If the metadata indicates that the alternate location is on another drive, then the drive controller can instruct the host bus adapter (HBA), such as a RAID controller, to which the drive is connected to retrieve the file transparently from the secondary location. Typically, there will be less delay in obtaining the file from the alternate location than in repeatedly attempting to read the original file.

Hard drives are prone to media errors and the drive has been designed to make every attempt to protect the user's data when they occur. The drive will attempt to recover data from a bad sector by attempting to read the failed sector multiple times, and if successful, mark the sector as bad and move the data to a new location assuming the original sector has some physical damage. The drives are designed as stand alone devices and make decisions of this type in a vacuum, transparent to the user, attached host bus adapter or RAID controller. Drive controllers have increased in performance while the hard drive platter/head set has mechanical limitations that keep it from keeping up. As a result, the controller has excess bandwidth while waiting on the platter's slow seek times. This excess bandwidth allows time for alternate file choices to be made without affecting the average latency of data responses.

FIG. 1 is a diagram of a system 10 including a computer 20 and storage devices 40 in accordance with one embodiment of the invention. The computer 20 has a processor 22 that is in communication with memory 24 and an expansion bus 26, such as a Peripheral Component Interconnect Express (PCI-e) bus. The memory 24 includes application programs 28 and an operating system 30. In accordance with embodiments of the invention, an agent 32 is also provided, preferably as part of the operating system 30. However, in alternate embodiments, the agent could be included with the RAID controller 42. The processor 22 loads and runs the operating system 30 and any of the application programs 28, and facilitates interaction with the storage devices 40 via the expansion bus 26.

As shown in the embodiment of FIG. 1, the storage devices 40 include a redundant array of independent disks (RAID) controller 42 that is connected to the expansion bus 26. The RAID controller 42 serves as the host bus adapter for a first hard disk drive 50, a second hard disk drive 60 and a third hard disk drive 70, all of which may be identical. The first hard disk drive 50, for example, has a controller 52 that controls the operation of the storage device 54, such as a hard disk. The controller 52 also maintains metadata 58 that is associated with the files. The metadata 58 may be stored on the storage device 54 or in alternate storage under the direction of the controller 52. Still further, the controller 52 includes a media error handling and recovery module 59.

As shown in the embodiment of FIG. 1, the storage devices 40 include a redundant array of independent disks (RAID) controller 42 that is connected to the expansion bus 26. The RAID controller 42 serves as the host bus adapter for a first hard disk drive 50, a second hard disk drive 60 and a third hard disk drive 70, all of which may be identical. The first hard disk drive 50, for example, has a controller 52 that controls the operation of the storage device 54, such as a hard disk. The controller 52 also maintains metadata 58 that is associated with the files 56, 57. The metadata 58 may be stored on the storage device 54 or in alternate storage under the direction of the controller 52. Still further, the controller 52 includes a media error handling and recovery module 59.

As shown, the first storage device 54 stores a first file ("File 1") 56 and a second file ("File 2") 57, typically along with many other files. In accordance with embodiments of the invention, the metadata 58 includes metadata that is associated with the File 1, metadata that is associated with the File 2, and metadata associated with any other files on the storage device 54. The metadata that is associated with File 1 will indicate the location of File 2, which is a duplicate of File 1, and the metadata that is associated with File 2 will indicate the location of File 1.

The agent 32 is responsible for detecting that a first file and a second file are duplicates. Preferably, the agent detects duplicate files by monitoring files as they are written to the storage system 40. For example, in response to an application program requesting that a second file 57 be written to a storage device 64, the agent compares the second file 57 to files previously stored on the storage devices 54, 64, 74. In one embodiment, the agent 32 compares a digest of the second file to digests of the files previously stored.

Assuming that File 1 and File 2 are found to be duplicates, the agent instructs the relevant disk drive controllers 52 to write metadata to the file metadata 58 in association with the first and/or second file 56, 57, wherein the metadata identifies the location of the other one of the duplicate files. When an application program requests a first read operation to read the first file 56, for example, the controller 52 attempts to read the file from the storage device 54. If a media error occurs during the attempted read operation, the controller 52 reads the metadata associated with the first file 56 to identify the location of the second file 57, which is a duplicate of the first file 56. Next, a second read operation is initiated by the controller 52 in order to read the second file 57 instead of the first file 56. The second file 57 is then provided to the application program 28 in satisfaction of the requested first read operation.

The media error handling and recovery modules 59, 69, 79 of the controllers 52, 62, 72 may be responsible for storing and retrieving the metadata associated with the duplicate files and for initiating the second read operation that reads the other of the duplicate files as identified in the metadata. In addition, the media error handling and recovery modules 59, 69, 79 may, as the name implies, handle error correction procedures in the event of a media error. Since the second read operation is used to provide the application program with the requested file, error correction may proceed at the same time. Alternatively, if the storage device storing the file that is the subject of the media error is busy handling a heavy workload of read/write operations, then error correction can be delayed or scheduled for a time when the workload is lighter.

Figure 2:
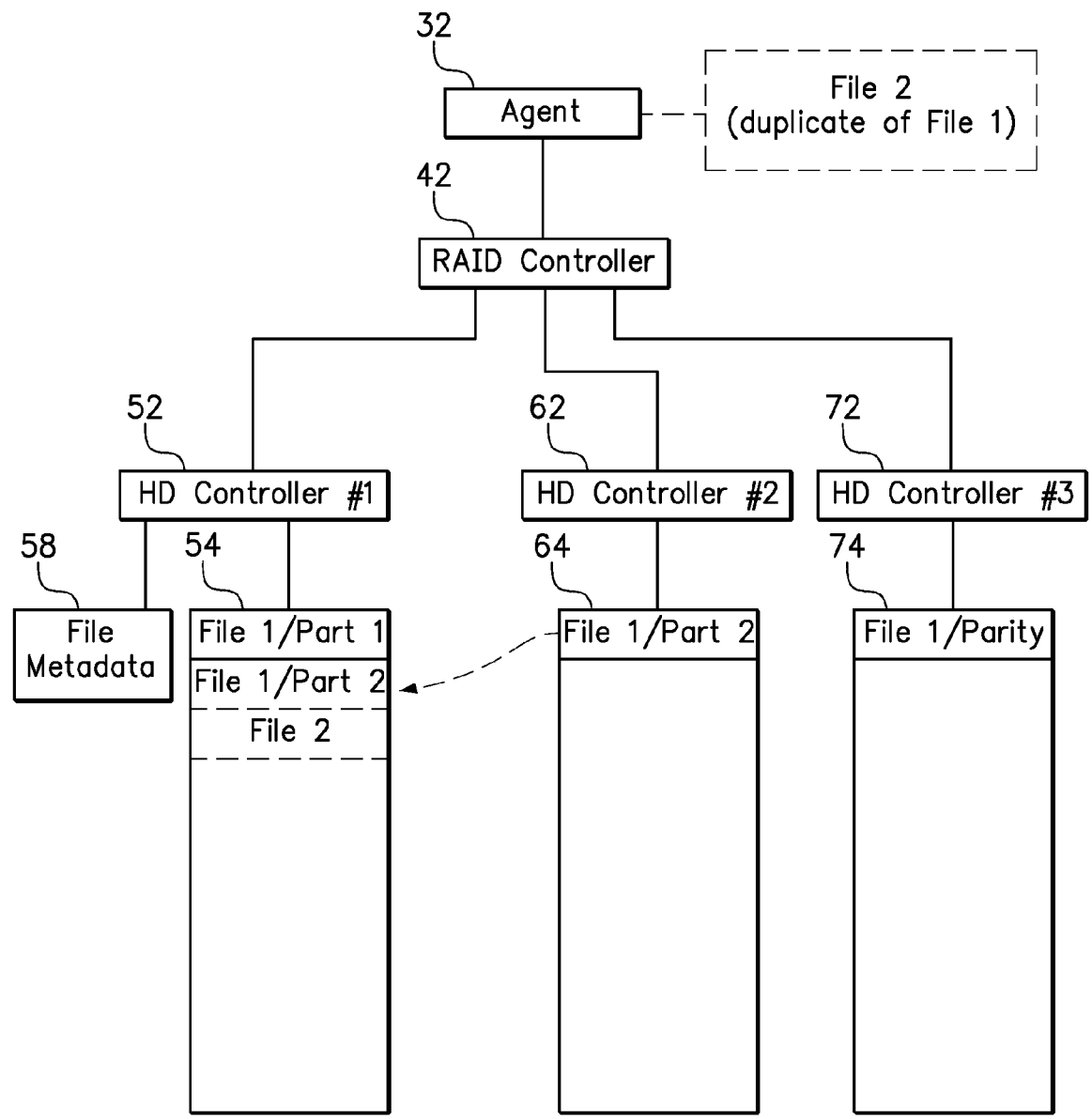
FIG. 2 is a diagram of an agent interacting with a RAID array with three disk drives.

FIG. 2 is a diagram of an agent interacting with a RAID array having three disk drives. The diagram in FIG. 2 is intended to be consistent with FIG. 1, but simplified to emphasize the storage of files on the storage devices. In this example, the agent 32 detects that an application program has instructed that File 2 be written to the RAID array. Accordingly, the agent 32 detects that File 2 is a duplicate of File 1. However, in accordance with a RAID protocol, File 1 is spread across a major stripe of the RAID array, such that File 1/Part 1 is stored on the first storage device 54, File 1/Part 2 is stored on the second storage device 64, and the third storage device 74 stores a File 1/Parity segment.

In accordance with the invention, since the first file (File 1) and the second file (File 2) have been determined to be duplicates, both files are to be stored on the same (target) storage device. As shown, the target storage device is the first storage device 54. Since File 1/Part 1 is already stored on the first storage device 54, that segment of File 1 can remain where it is. However, File 1/Part 2 needs to be copied or moved from the second storage device 64 to the first storage device 54 so that the entirety of File 1 will be stored on the first storage device 54. File 2 may be directly written to the first storage device 54 so that both of the duplicate files, File 1 and File 2, are stored on the same (target) storage device.

Furthermore, the metadata 58 should be supplemented so that metadata associated with File 1 identifies the location of the duplicate File 2 and metadata associated with File 2 identifies the location of the duplicate File 1. Accordingly, if a media error occurs during a read operation to one of the duplicate files, the other of the duplicate files may be read in satisfaction of the read operation. Beneficially, having the two duplicate files together on the same storage device allows the local controller 52 to automatically redirect the read operation from one file to the other duplicate file without the involvement of the agent or the other controllers in the RAID array.

Figure 3:
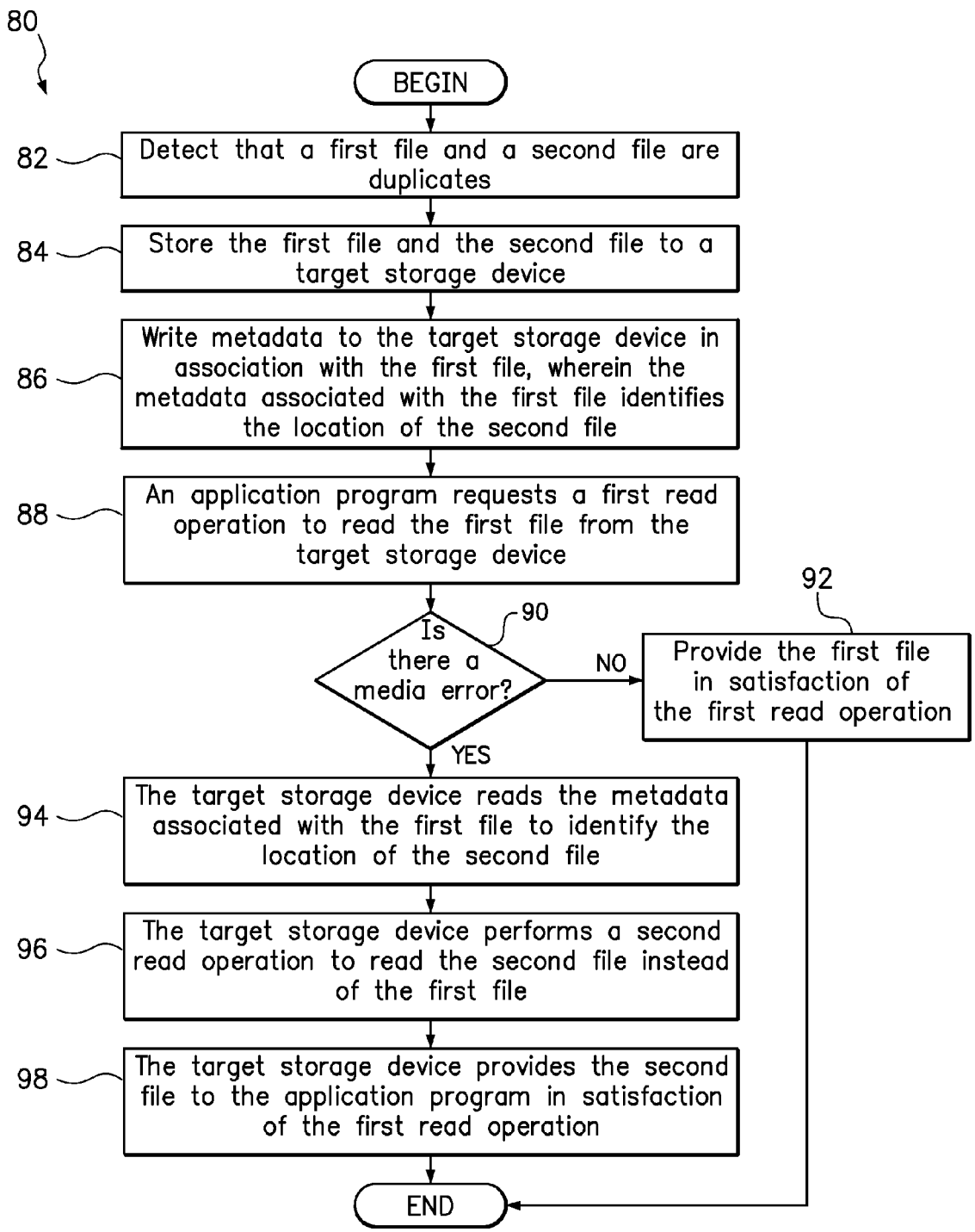
FIG. 3 is a flowchart of a method in accordance with another embodiment of the invention.

FIG. 3 is a flowchart of a method 80 in accordance with another embodiment of the invention. In step 82, the method detects that a first file and a second file are duplicates. In step 84, the first file and the second are stored to a target storage device. In step 86, metadata is written to the target storage device in association with the first file, wherein the metadata identifies the location of the second file that is a duplicate of the first file. A first read operation to read the first file from the target storage device is then received from an application program in step 88. If there is no media error detected in step 90, then the method provides the first file in satisfaction of the first read operation in step 92 and the method ends. However, if a media error is determined to have occurred in step 90, then the target storage device reads the metadata associated with the first file to identify the location of the second file (step 94), the target storage device performs a second read operation to read the second file instead of the first file (step 96), and the target storage device provides the second file in satisfaction of the requested first read operation (step 98) before the method ends.

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   detecting that a first file and a second file are duplicates;
   copying a first previously stored segment of the first file from a second storage device to a target storage device so that all of the first file is stored on the target storage device;
   storing the second file to the target storage device;
   writing metadata to the target storage device in association with the first file, wherein the metadata associated with the first file identifies the location of the second file;
   an application program requesting a first read operation to read the first file from the target storage device; and
   the target storage device, in response to a media error that results from the first read operation, reading the metadata associated with the first file to identify the location of the second file, performing a second read operation to read the second file instead of the first file, and providing the second file to the application program in satisfaction of the requested first read operation.

2. The method of claim 1, wherein the target storage device and the second storage device are in a RAID array.

3. The method of claim 1, wherein copying a first previously stored segment of the first file from a second storage device to a target storage device includes selecting the target storage device on the basis that a second previously stored segment of the first file is stored on the target storage device and the second previously stored segment is larger than the first previously stored segment.

4. The method of claim 1, wherein copying a first previously stored segment of the first file from a second storage device to a target storage device includes copying previously stored segments of the first file from more than one stripe on a RAID array.

5. The method of claim 1, wherein detecting that the first file and the second file are duplicates is performed by an agent running in an operating system.

6. The method of claim 5, wherein detecting that a first file and a second file are duplicates includes the agent, in response to the application program requesting that the second file be written to a storage device, comparing the second file to files previously stored.

7. The method of claim 6, wherein comparing the second file to the files previously stored includes comparing a digest of the second file to digests of the files previously stored.

8. The method of claim 1, further comprising:
   writing metadata to the target storage device in association with the second file, wherein the metadata associated with the second file identifies the location of the first file.

9. The method of claim 1, further comprising:
   performing media error correction on the first file after the second file has been provided to the application program in satisfaction of the requested first read operation.

10. The method of claim 1, further comprising:
    scheduling media error correction on the first file to occur when the workload on the first storage device is below a predetermined level.

11. A computer program product including computer usable program code embodied on a nontransitory computer readable storage medium for handling media errors, the computer program product including:
    computer usable program code for detecting that a first file and a second file are duplicates;
    computer usable program code for copying a first previously stored segment of the first file from a second storage device to a target storage device so that all of the first file is stored on the target storage device
    computer usable program code for storing the second file to the target storage device;
    computer usable program code for writing metadata to the target storage device in association with the first file, wherein the metadata associated with the first file identifies the location of the second file;
    computer usable program code for responding to a media error that results from a first read operation to read the first file including reading the metadata associated with the first file to identify the location of the second file, performing a second read operation to read the second file instead of the first file, and providing the second file in satisfaction of the requested first read operation.

12. The computer program product of claim 11, further comprising:
    computer usable program code for scheduling media error correction on the first file to occur when the workload on the storage device is below a predetermined level.

13. The computer program product of claim 11, wherein the computer usable program code for copying a first previously stored segment of the first file from a second storage device to a target storage device includes computer usable program code for selecting the target storage device on the basis that a second previously stored segment of the first file is stored on the target storage device and the second previously stored segment is larger than the first previously stored segment.

14. The computer program product of claim 11, wherein the computer usable program code for copying a first previously stored segment of the first file from a second storage device to a target storage device includes computer usable program code for copying previously stored segments of the first file from more than one stripe on a RAID array.

15. The computer program product of claim 11, wherein the computer usable program code for detecting that a first file and a second file are duplicates includes computer usable program code for comparing a digest of the second file to digests of files previously stored.

16. The computer program product of claim 11, further comprising:
    computer usable program code for performing media error correction on the first file after the second file has been provided to the application program in satisfaction of the requested first read operation.

* * * * *